J. K. HOSAKA.
BICYCLE STAND.
APPLICATION FILED JUNE 1, 1915.

1,180,921.

Patented Apr. 25, 1916.

WITNESSES:

INVENTOR
James K. Hosaka

UNITED STATES PATENT OFFICE.

JAMES K. HOSAKA, OF SAN JOSE, CALIFORNIA.

BICYCLE-STAND.

1,180,921.

Specification of Letters Patent.

Patented Apr. 25, 1916.

Application filed June 1, 1915. Serial No. 31,483.

*To all whom it may concern:*

Be it known that I, JAMES K. HOSAKA, a subject of the Emperor of Japan, residing at San Jose, in the county of Santa Clara and State of California, have invented new and useful Improvements in Bicycle-Stands, of which the following is a specification.

This invention relates to a bicycle stand.

The object of the present invention is to provide a simple, rigid, cheaply manufactured bicycle stand, particularly constructed for use on motorcycles, which is adapted to be locked to the bicycle frame when in the verticle supporting position and spring supported when in the horizontal, released position.

The invention consists of the parts and the construction and combination of parts as hereinafter more fully described and claimed, having reference to the accompanying drawings, in which—

Figure 1:
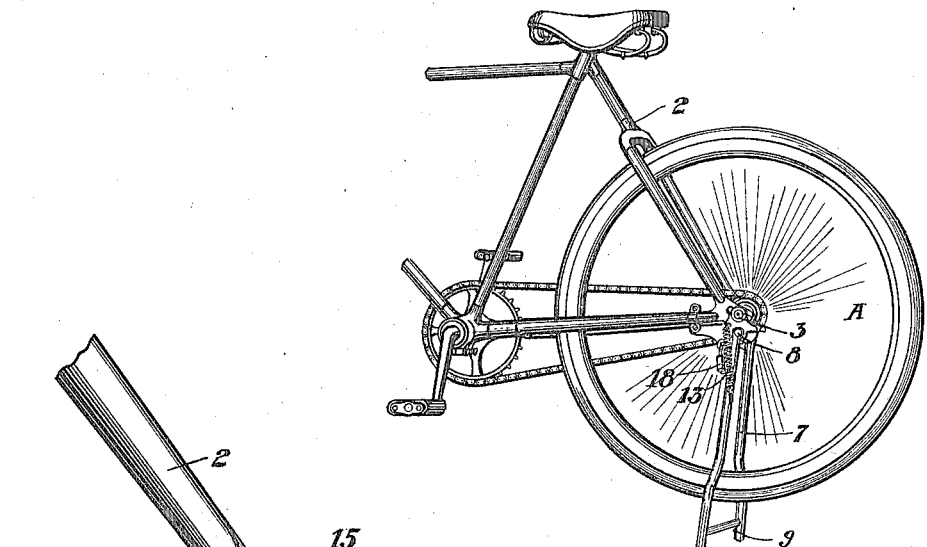
Figure 2:
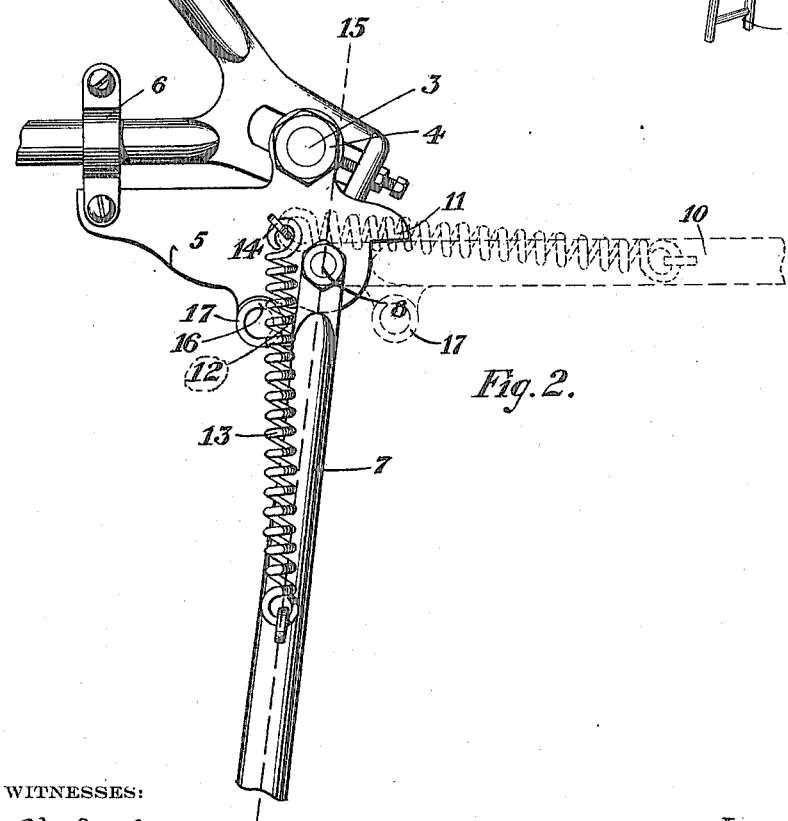

Figure 1 is a partial side elevation of the rear wheel and frame of a motorcycle, showing the application of the invention. Fig. 2 is an enlarged side elevation of the stand, partly broken away.

A indicates the rear wheel of a bicycle and 2 a portion of the rear end of the frame. Adapted to be slipped on the outer end of the axle or spindle 3, exteriorly of the frame, and secured thereon, by means of a nut 4, is a plate 5, and for the purpose of further securing the plate a screw clamp 6 has been provided which embraces the lower horizontal bar of the frame.

There are two plates provided, one for each side of the wheel, and these plates serve as supports for a pair of connected legs or uprights 7 which form the stand proper. The upper ends of the legs are pivotally attached to the plates, as at 8, and the lower ends are connected by means of a cross bar 9. The stand, comprising the legs 7, is adapted to be swung about pivotal point 8 to assume the vertical position shown in Figs. 1 and 2 or the horizontal dotted line position indicated at 10. The swinging movement of the stand from one position to the other is limited by a pair of lugs 11 and 12 formed on the plates, and the stand is automatically held in engagement with the limiting lug when in either position by means of a coil spring 13. The upper end of the spring is attached to the side plate, as at 14, at a point out of alinement with the center line of the stand, as indicated at 15. The tension of the spring will thus automatically hold the stand in one position or the other without the necessity of employing any other mechanism.

For the purpose of locking the stand when in the vertical position, a perforated lug 16 has been provided on the lower side of plate 5. A similar lug 17, formed on the stand, assumes a position in direct alinement with lug 16 when the stand is in the vertical supporting position. Any suitable form of lock, such as indicated at 18, may thus be inserted through the perforations formed in the registering lugs, thus securing or locking the parts together and making it impossible for any unauthorized person to use the bicycle as it is necessary to swing the stand into the horizontal position before the driving wheel can be lowered into engagement with the ground. The registering lugs 16 and 17 may be formed on both plates and legs 7, if desired, but are in this instance only shown as formed on one side as this is all that is necessary to lock the stand against movement.

The stand is simple and substantial in construction and easy to operate, as it is automatically held by spring tension in one position or the other.

The materials and finish of the several parts of the device are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. A bicycle stand comprising a pair of elongated plates adapted to be secured at one end to the rear wheel axle and at the other end to the frame of the bicycle, a pair of legs pivotally attached to the plates and adapted to swing on the plates from a horizontal position to a vertical position, a perforated lug formed on the plate, a perforated lug on the leg which registers with the perforated plate lug when the leg is in a vertical position, stop lugs on the plate to limit the swinging movement of the legs, the plate perforated lug being arranged in advance of one of the stop lugs whereby the specified stop lug will limit the movement of the legs when the perforated lugs are in registering relation, and means insertible through the perforated registering lugs to lock the members against movement.

2. The combination with the rear axle and frame of a bicycle, of a pair of plates each secured at its rear end on the axle and its forward end fastened to the frame, the rear under portion of one of the plates being formed with a rearwardly and upwardly curved edge and a stop lug at each end of the curved edge, a perforated lug depending from the lower edge of the specified plate in advance of the stop lug at the forward terminal of the curved edge, a pair of legs secured pivotally to the plates in concentric relation with the curved edge thereof and adapted to engage with the stop lugs as limits of its swinging movement, a forwardly projecting perforated lug carried by one of the legs for registering with the plate perforated lug when the leg abuts the forward stop lug whereby the perforated lugs may be locked together, and a coiled spring connecting one of the plates to the adjacent leg and arranged to hold the legs at either limit of its travel.

In testimony whereof I have hereunto set my hand in the presence of two subscribing witnesses.

JAMES K. HOSAKA.

Witnesses:
 JOHN H. HERRING,
 W. W. HEALEY.

Copies of this patent may be obtained for five cents each, by addressing the "Commissioner of Patents, Washington, D. C."